(12) United States Patent
Heath et al.

(10) Patent No.: US 9,181,392 B2
(45) Date of Patent: Nov. 10, 2015

(54) YIELD OPTIMIZATION OF POLYCARBONATE POLYOLS

(71) Applicants: William H. Heath, Lake Jackson, TX (US); Harpreet Singh, Pearland, TX (US); Amarnath Singh, Pearland, TX (US); Jorge Jimenez, Lake Jackson, TX (US); Qiuyun Xu, Pearland, TX (US)

(72) Inventors: William H. Heath, Lake Jackson, TX (US); Harpreet Singh, Pearland, TX (US); Amarnath Singh, Pearland, TX (US); Jorge Jimenez, Lake Jackson, TX (US); Qiuyun Xu, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/379,576

(22) PCT Filed: Mar. 13, 2013

(86) PCT No.: PCT/US2013/030805
§ 371 (c)(1),
(2) Date: Aug. 19, 2014

(87) PCT Pub. No.: WO2013/148192
PCT Pub. Date: Oct. 3, 2013

(65) Prior Publication Data
US 2015/0025217 A1    Jan. 22, 2015

Related U.S. Application Data

(60) Provisional application No. 61/616,730, filed on Mar. 28, 2012.

(51) Int. Cl.
*C08G 64/00* (2006.01)
*C08G 64/30* (2006.01)
*C08G 64/02* (2006.01)
*C08G 63/02* (2006.01)

(52) U.S. Cl.
CPC .......... *C08G 64/305* (2013.01); *C08G 64/0208* (2013.01)

(58) Field of Classification Search
CPC ...................................... C08G 64/307
USPC .......................... 528/370, 196, 198; 524/590
See application file for complete search history.

(56) References Cited

U.S. PATENT DOCUMENTS

| | | | |
|---|---|---|---|
| 6,818,784 | B2 | 11/2004 | Tillack et al. |
| 7,112,693 | B2 | 9/2006 | Tillack et al. |
| 7,420,077 | B2 | 9/2008 | Hofacker et al. |
| 2003/0009047 | A1 | 1/2003 | Tillack et al. |

FOREIGN PATENT DOCUMENTS

CN            101148502 A        3/2008

OTHER PUBLICATIONS

International Search Report and Written Opinion o fthe International Search Authority for PCT/US2013/030805, Mail Date Jun. 26, 2013, pp. 1-8.
E. Foy, et al., Synthesis of Linear Aliphatic Polycarbonate Macroglycols Using Dimethylcarbonate, Journal of Applied Polymer Science, Jan. 5, 2009, pp. 217-227.
International Preliminary Report on Patentability for PCT/US2013/030805, Issuance Date Oct. 1, 2014, pp. 1-4.

*Primary Examiner* — Terressa Boykin

(57) ABSTRACT

Embodiments of the invention provide for methods of producing a polycarbonate polyol. The method includes charging a vessel with butanediol, charging the vessel with a polymerization catalyst, and adding to the vessel dimethyl carbonate at a rate of at least 2.0 g of DMC per minute per kg of BDO to produce polycarbonate polyol at a polycarbonate polyol yield of at least 80% of a theoretical yield.

6 Claims, 2 Drawing Sheets

YIELD OPTIMIZATION OF POLYCARBONATE POLYOLS

FIELD OF THE INVENTION

Figure 1:
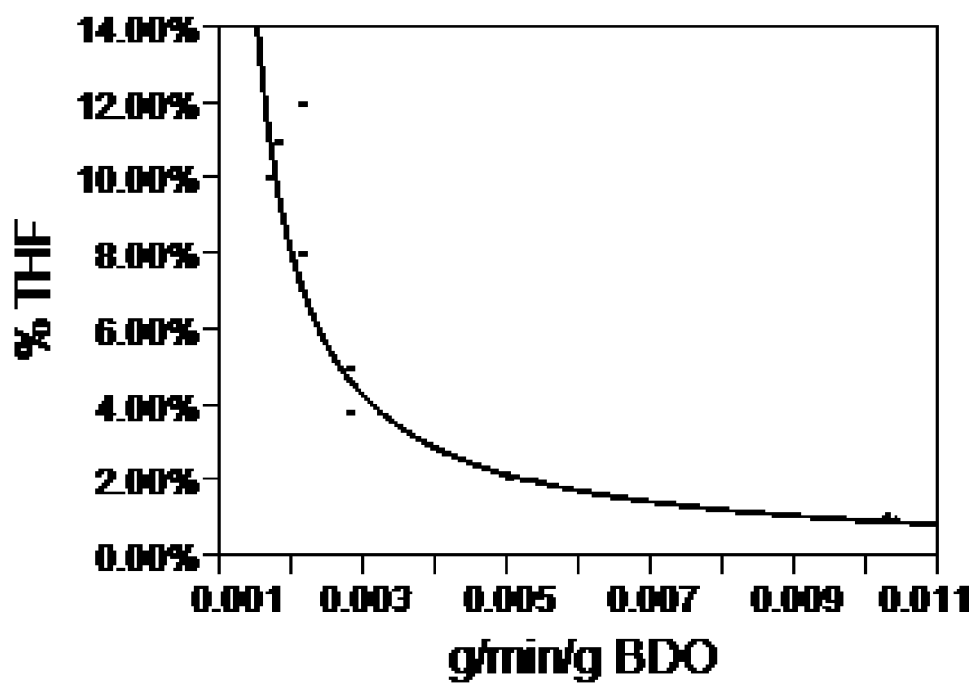

Embodiments of the invention relate to methods of making polycarbonate polyols, more specifically to methods of making polybutylene carbonate polyol with less byproducts.

BACKGROUND OF THE INVENTION

Polycarbonate polyols may be used as components in the formation of certain polyurethanes, such as polyurethanes used for elastomers or coatings. Polycarbonate polyols may be prepared by reacting at least a polyol component such as 1,4-butanediol, 1,5-pentanediol, 3-methyl-1,5-pentanediol, 1,6-hexanediol, 2-methyl-1,8-octanediol, 1,9-nonanediol, or 1,4-cyclohexanedimethanol with an organic carbonate, such as for example dimethyl carbonate. Particularly polybutylene carbonate polyols are of interest. Polybutylene carbonate polyols are made by reacting 1,4-Butanediol and dimethyl carbonate. However, this reaction has a low yield, typically less than 75% of the theoretically obtainable yield. One of the major side products is tetrehydrofuran (THF) which needs to be removed from the final product. Therefore there is a need for a method of producing polybutylene carbonate polyols with less THF formation and thus with a higher yield.

SUMMARY OF THE INVENTION

Embodiments of the invention provide for methods of producing polybutylene carbonate polyols with less THF formation and thus with a higher yield of polybutylene carbonate polyols.

Embodiments include a method for producing a polycarbonate polyol. The method includes:
  charging a vessel with butanediol (BDO);
  charging the vessel with a polymerization catalyst; and
  adding to the vessel dimethyl carbonate (DMC) at a rate of at least 2.0 g of DMC per minute per kg of BDO to produce polycarbonate polyol at a polycarbonate polyol yield of at least 80% of a theoretical yield.

DESCRIPTION OF EMBODIMENTS OF THE INVENTION

Embodiments of the invention provide for methods of producing polybutylene carbonate polyols with less THF formation and thus with a higher yield of polybutylene carbonate polyols. According to embodiments of the invention, the polybutylene carbonate polyols may be obtained by reacting butanediol with dimethyl carbonate in a transesterification polymerization reaction. With respect to the method for performing the polymerization reaction, there is no particular limitation, and the polymerization reaction can be performed by using conventional methods known in the art. However, it has surprisingly been found that increased yield and lower amounts of THF formation may be obtained by charging a vessel with butanediol and at least one polymerization catalyst and adding to the vessel dimethyl carbonate (DMC) at a rate of at least 2.0 g of DMC per minute per kg of BDO. The rate of DMC addition may in certain embodiments be at least 2.4, 2.5, 2.7, 3.0, 3.5, 4.0, 4.5, 5.0, 5.3, 5.4, 5.5, 6, 7, 8, 10, 15, or 20 g of DMC per minute per kg of BDO.

Temperatures for the transesterification reaction may be between 120 degrees Celsius and 240 degrees Celsius. All individual values and subranges from 120 to 240 degrees Celsius are included herein and disclosed herein; for example, the temperature can be from a lower limit of 120, 130, 140, 150, 160, 170, 180, 190, or 200 degrees Celsius to an upper limit of 140, 150, 160, 170, 180, 190, 200, 210, 220, 230, or 240 degrees Celsius.

Although lower or higher pressures may be used, it surprisingly has been found that the higher yield of polybutylene carbonate polyols may be obtained also when the transesterification reaction is performed at atmospheric pressure, thus eliminating any need for incorporating methods of elevating or lowering reaction vessel pressures. Reaction time may depend on variables such as temperature, pressure, type of catalyst and catalyst concentration.

The at least one polymerization catalyst may in principle be all soluble catalysts which are known for transesterification reactions (homogeneous catalysis) Heterogeneous transesterification catalysts can also be used. The process according to the invention is preferably conducted in the presence of a catalyst.

Hydroxides, oxides, metal alcoholates, carbonates and organometallic compounds of metals of main groups I, II, III and IV of the periodic table of the elements, of subgroups III and IV, and elements from the rare earth group, particularly compounds of Ti, Zr, Pb, Sn, Sb, and Yb are particularly suitable for the processes described herein.

Suitable examples include: LiOH, $Li_2CO_3$, $K_2CO_3$, KOH, NaOH, KOMe, NaOMe, MeOMgOAc, CaO, BaO, KOt-Bu, $TiCl_4$, titanium tetraalcoholates or terephthalates, zirconium tetraalcoholates, tin octoate, dibutyltin dilaurate, dibutyltin, bistributyltin oxide, tin oxalate, lead stearate, antimony trioxide, zirconium tetraisopropylate, and ytterbium acetyl acetonate.

Aromatic nitrogen heterocycles can also be used in the process described herein, as can tertiary amines corresponding to $R_1R_2R_3N$, where $R_{1-3}$ independently represents a $C_1$-$C_{30}$ hydroxyalkyl, a $C_4$-$C_{30}$ aryl or a $C_1$-$C_{30}$ alkyl, particularly trimethylamine, triethylamine, tributylamine, N,N-dimethylcyclohexylamine, N,N-dimethyl-ethanolamine, 1,8-diaza-bicyclo-(5.4.0)undec-7-ene, 1,4-diazabicyclo-(2.2.2)octane, 1,2-bis(N,N-dimethyl-amino)-ethane, 1,3-bis (N-dimethyl-amino)propane and pyridine.

Alcoholates and hydroxides of sodium and potassium (NaOH, KOH, KOMe, NaOMe), alcoholates of titanium, tin or zirconium (e.g. $Ti(OPr)_4$), as well as organotin compounds may also be used, wherein titanium, tin and zirconium tetraalcoholates may be used with diols which contain ester functions or with mixtures of diols with lactones.

The amount of catalyst present depends on the type of catalyst. In certain embodiments described herein, the homogeneous catalyst is used in concentrations (expressed as percent by weight of metal with respect to the aliphatic diol used) of up to 10,000 ppm (1%) or 1,000 ppm (0.1%) such as between between 1 ppm and 500 ppm (0.05%), or between 5 ppm and 100 ppm (0.01%). After the reaction is complete, the catalyst may be left in the product, or can be separated, neutralized or masked. The catalyst may be left in the product.

Embodiments of the polycarbonate polyol include polybutylene carbonate polyols having a number average molecular weight of between about 500 and 5000 g/mole. All individual values and subranges from 500 to 5000 are included herein and disclosed herein; for example, the number average molecular weight can be from a lower limit of 500, 600, 700, 900, 1000, 1200, 1500, 2000, 2500, 3000, 3500, or 4000 g/mole to an upper limit of 700, 900, 1000, 1200, 1500, 2000, 2500, 3000, 3500, 4000, 4500, or 5000 g/mole. In certain embodiments the number average molecular weight is about 2000.

The one or more polycarbonate polyols may have a hydroxyl number from about 22 to about 220 mg KOH/g. All individual values and subranges from 22 to 220 are included herein and disclosed herein; for example, the hydroxyl number can be from a lower limit of 22, 25, 30, 35, 40, 50, 60, 75, 90, 100, 125, 150, or 175 to an upper limit of 30, 35, 40, 50, 60, 75, 90, 100, 125, 150, 175, 180, 190, 200, 210, or 220. Embodiments encompass polycarbonate polyols having a hydroxyl number from about 45 to 75 mg KOH/g.

The one or more polycarbonate polyols may have a viscosity from about 4,000 to about 25,000 centipoise (cp) measured at 60 degrees Celsius by parallel plate rheometry. All individual values and subranges from 4,000 to 25,000 are included herein and disclosed herein; for example, the viscocity can be from a lower limit of 4000, 5000, 6000, 7000, 8000, 10000, 12000, 14000, 15000, or 17000 cp to an upper limit of 6000, 7000, 8000, 10000, 12000, 14000, 15000, 17000, 18000, 19000, 20000, 22000, or 25000 cp.

FIG. 1 is a graph showing THF formation versus the inverse of normalized addition rate of DMC. It can be seen that less THF is produced at higher normalized addition rates. THF concentration may be measured in the distillate using gas chromatography (GC) relative to stock standard solutions.

Figure 2:
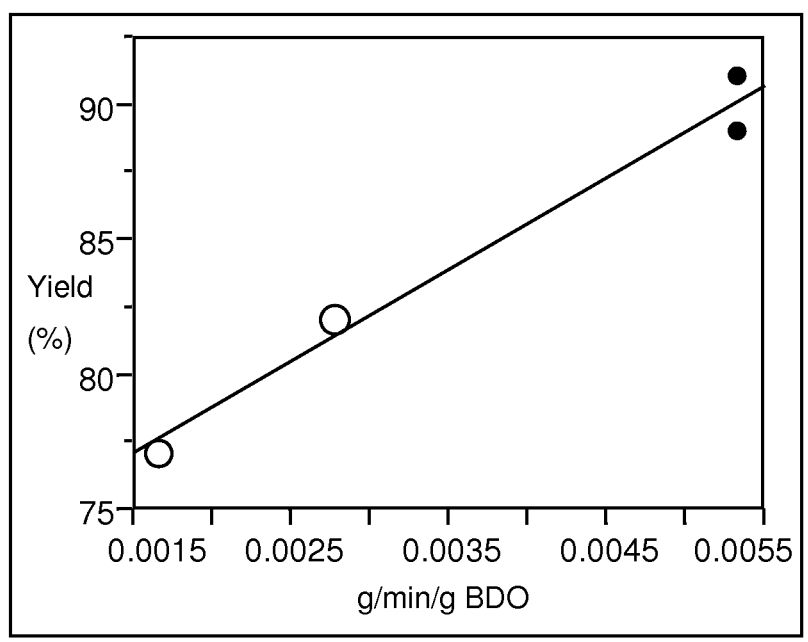

FIG. 2 is a graph showing the yield of polybutylene carbonate polyols obtained. The yield is determined by measuring the amount of obtained polybutylene carbonate polyol as a percentage of the theoretical obtainable yield (Closed circles=lab data, Open circles=pilot data). The theoretical obtainable yield is determined by assuming that BDO is the limiting reagent. Hence, the theoretical yield is calculated with the following equations:

Mass of BDO/Molecular weight of BDO (90.12 g/mol)=Moles of polycarbonate repeat unit  (I)

Moles polycarbonate repeat unit×Molecular weight of polycarbonate repeat unit (116.12 g/mole)=theoretical Mass of polycarbonate.  (II)

Embodiments encompass that when a rate of DMC addition is at least 2.4 g of DMC per minute per kg of BDO, a polybutylene carbonate polyol yield of at least 80% is obtained and/or no more than 5% THF is produced.

Embodiments encompass that when a rate of DMC addition is at least 5.4 g of DMC per minute per kg of BDO, a polybutylene carbonate polyol yield of at least 85% is obtained and/or no more than 4% THF is produced.

EXAMPLES

The following examples are provided to illustrate the embodiments of the invention, but are not intended to limit the scope thereof. All parts and percentages are by weight unless otherwise indicated.

The following materials are used:
Dimethyl Carbonate (DMC) Available from KOWA American Corporation.
1,4-Butanediol (BDO) Available from International Specialty Products.
TYZOR TPT A tetra-isopropyl titanate catalyst which is a reactive organic alkoxy titanate with 100% active content, available from DuPont.

Example 1

A 4-neck round-bottom flask is equipped with a Dean-Stark trap, a thermocouple, and a mechanical stirrer. The fourth port is used to add dimethyl carbonate. The flask is heated using a heating mantle and the reaction temperature monitored via the thermocouple. BDO (75 g) is added to the flask and heated to 150° C. under a stream of nitrogen to provide an inert atmosphere. TYZOR TPT catalyst (30.98 mg) is added via syringe. DMC (114 g) is added via peristaltic pump at rate to complete addition in 4 hours 40 minutes (5.4 g/min/kg BDO). Upon completion of DMC addition, the temperature is controlled via overhead temp and allowed to increase to 200° C. The reactant temperature is reduced to 170° C. and a nitrogen stream is passed over the reaction overnight to remove any residual DMC and methanol. The polycarbonate polyol molecular weight is adjusted by the addition of BDO (0.6 g) at 170° C. with stirring for 1 hour. Theoretical Yield 96.27 g. Actual Yield 87.28 g (90%). The resulting number average molecular weight is 1936 g/mol relative to PEG standards.

Comparative Example A

BDO (67.586 kg) is charged into a 30 gallon reactor equipped with hot oil temperature control, mechanical stirring, sparge ring, and distillation column with water cooling. The reactor is degassed three times with nitrogen and swept with nitrogen and heated to 150° C. TYZOR TPT catalyst (22 g) is added and DMC addition begun. DMC (102.1 kg) is added over 15 hrs (1.68 g/min/kg BDO). Upon completion of DMC addition, the reaction temperature is increased to 200° C. and heated for an additional 2 hours before introducing nitrogen sparge at 1.5 scfm for 2.0 hours. The reaction is continued under reduced pressure (4.8 PSIA) with nitrogen sparging (0.6 scfm) for 6 hours. The resulting polymer is analyzed by GPC and the molecular weight was corrected with 3 additions of BDO for a total of 2413 g. Theoretical Yield 89.27 kg. Yield 68.78 kg (77.0%). The resulting number average molecular weight is 2150 g/mol relative to PEG standards.

Example 2

BDO (67.78 kg) is charged into 30 gallon reactor equipped as in Comparative Example A. The reactor is degassed three times with nitrogen and swept with nitrogen and heated to 150° C. TYZOR TPT catalyst (21.9 g) is added and DMC addition begun. DMC (102.4 kg) is added over 9 hrs (2.8 g/min/kg BDO). Upon completion of DMC addition, the reaction temperature is increased to 200° C. and heated for an additional 2 hours, followed by nitrogen sparge at 1.5 scfm for 2.0 hours. The reaction is continued under reduced pressure (4.8 PSIA) with nitrogen sparging (0.6 scfm) for 6 hours. The resulting polymer is analyzed by GPC and the molecular weight is corrected to 2000 g/mol with 3 additions of BDO totaling 862 g. Theoretical Yield 86.95 kg-2.05 kg (samples) is 84.9 kg. Yield 70.95 kg (83.5%). The resulting number average molecular weight is 2607 g/mol relative to PEG standards.

While the foregoing is directed to embodiments of the present invention, other and further embodiments of the invention may be devised without departing from the basic scope thereof, and the scope thereof is determined by the claims that follow.

The invention claimed is:
1. A method for producing a polycarbonate polyol, the method comprising:
charging a vessel with butanediol (BDO);
charging the vessel with a polymerization catalyst; and
adding to the vessel dimethyl carbonate (DMC) at a rate of at least 2.4 g of DMC per minute per kg of BDO to produce polycarbonate polyol at a polycarbonate polyol yield of at least 80% of a theoretical yield, wherein:

at least the BDO is heated to between about 120 degrees Celsius and 240 degrees Celsius before the DMC is added to the vessel, and a transesterification polymerization reaction is performed by reacting the BDO and the DMC at a temperature between about 120 degrees Celsius and 240 degrees Celsius to form the polycarbonate polyol having a number average molecular weight of between about 1500 and 2500 g/mol.

2. The method of claim 1, wherein less than 5% THF is produced based on the total amount of product.

3. The method of claim 1, wherein the dimethyl carbonate (DMC) is added to the vessel at a rate of at least 5.4 g of DMC per minute per kg of BDO.

4. The method of claim 3, wherein the polycarbonate polyol yield is at least 85% of the theoretical yield.

5. The method of claim 1, wherein the transesterification polymerization reaction is performed at atmospheric pressure.

6. The method of claim 1, wherein the rate is from 2.4 g of DMC per minute per kg of BDO to 5.5 g of DMC per minute per kg of BDO.

* * * * *